United States Patent [19]

Yasuda

[11] Patent Number: 5,740,640
[45] Date of Patent: Apr. 21, 1998

[54] CLIP FOR DOOR MOLDING

[75] Inventor: Mitsuhiro Yasuda, Kanagawa-ken, Japan

[73] Assignee: Nifco Inc., Yokohama, Japan

[21] Appl. No.: 780,892

[22] Filed: Jan. 9, 1997

Related U.S. Application Data

[63] Continuation of Ser. No. 449,812, May 24, 1995.

[30] Foreign Application Priority Data

Sep. 6, 1994 [JP] Japan ................... 6-212482

[51] Int. Cl.⁶ .................................................. E06B 7/16
[52] U.S. Cl. .................. 52/204.597; 52/204.591; 296/146.16; 296/146.2
[58] Field of Search .............. 52/204.591, 204.597; 296/146.2, 146.9, 146.15, 146.16; 49/377, 493.1; 24/297, 458

[56] References Cited

U.S. PATENT DOCUMENTS

| 4,135,277 | 1/1979 | Taniai et al. ......... 52/204.597 X |
| 4,161,851 | 7/1979 | Inamoto et al. ....... 52/204.597 X |
| 4,696,128 | 9/1987 | Fukuhara ................ 49/377 X |

FOREIGN PATENT DOCUMENTS

| 482999 | 4/1992 | European Pat. Off. ......... 296/146.16 |
| 2697477 | 5/1994 | France ............................ 296/146.16 |
| 2135317 | 11/1990 | Japan ............................ B60J 5/04 |
| 3244812 | 10/1991 | Japan ............................ F16B 19/00 |
| 439114 | 4/1992 | Japan ............................ B60J 5/04 |
| 405178097 | 7/1993 | Japan ............................ 296/146.2 |
| 1232344 | 5/1971 | United Kingdom ............... 52/204.597 |

*Primary Examiner*—Christopher Kent
*Assistant Examiner*—Yvonne Horton-Richardson
*Attorney, Agent, or Firm*—Michael D. Bednarek; Kilpatrick Stockton LLP

[57] ABSTRACT

A clip for door molding of vehicles is provided which pinches and holds an outer panel more securely. The clip for door molding for attaching a door molding having an inverted U-shaped cross-section onto the top margin of an outer panel of a door, wherein an inner engagement piece is upwardly formed inside the lower end of a planar body to pinch and hold the inner edge of the door molding with the body, and a pair of outer engagement pieces are downwardly at the opposite ends outside the upper end of the body, formed for engaging the outer edge of the door molding as well as for pinching and holding the top edge of the outer panel on the body, comprising an interposed engagement piece which is formed between the pair of outer engagement pieces, the interposed engagement piece having a contact section opposing to the edge of the top margin of the outer panel and a pinching section downwardly bent from the tip of the contact section to pinch and hold the top margin of the outer panel with the body. The clip pinches and holds more securely the outer panel by pinching the top margin of the outer panel not only with the outer engagement pieces but also the interposed engagement piece.

11 Claims, 7 Drawing Sheets

CLIP FOR DOOR MOLDING

This application is a file wrapper continuation of application Ser. No. 08/449,812, filed May 24, 1995.

BACKGROUND OF THE INVENTION

1. Field of the Invention

The present invention relates to a clip for door molding of vehicles.

2. Description of the Prior Art

Figure 9:
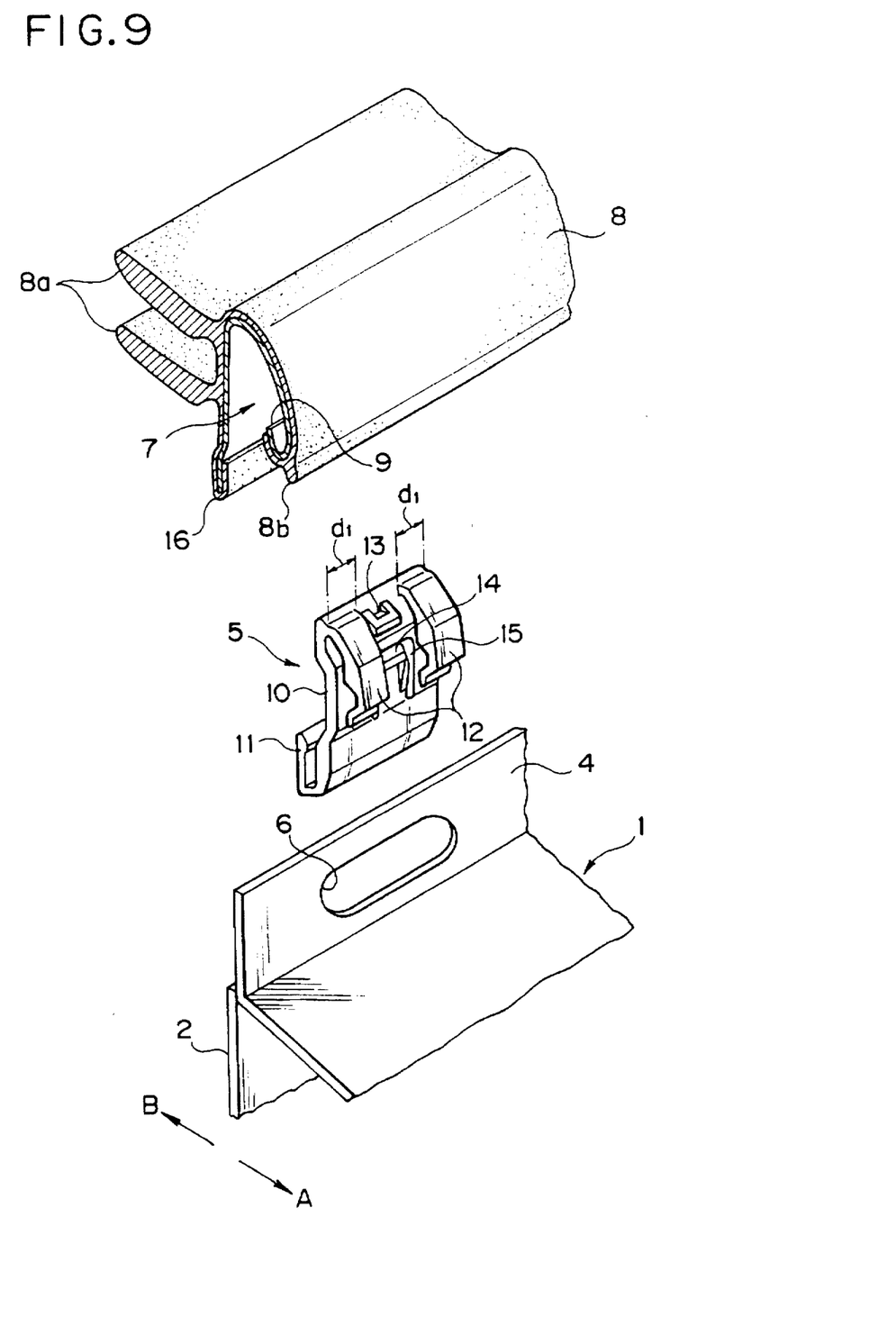
FIG. 9 shows a perspective view of a clip and door molding of the Prior Art.
Figure 10:
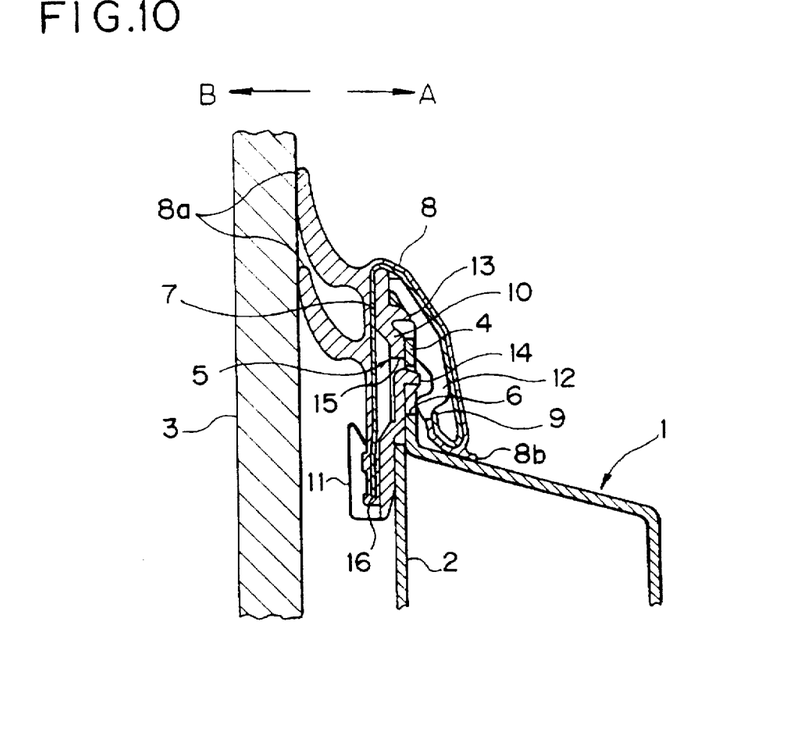
FIG. 10 shows a cross-sectional view indicating that the door molding is attached with the clip of the Prior Art to the top margin of an outer panel.
Figure 11:
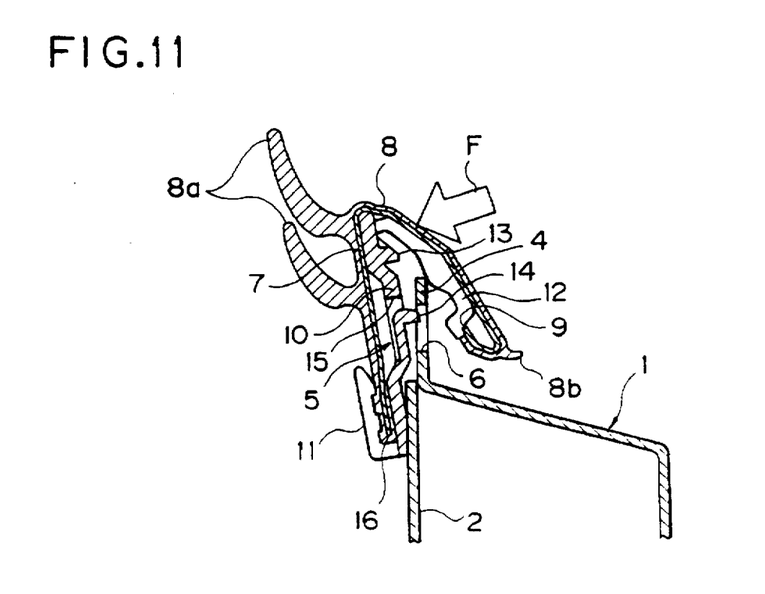
FIG. 11 shows a cross-sectional view corresponding to FIG. 10, indicating that the door molding is forced to be inclined.

There are known clips for door molding of vehicles of the Prior Art as shown in FIG. 9 to FIG. 11 (see Japanese Patent Laid Open 244812/1991). Hereinafter, a sign A designates outside, and B inside in the description.

Reference numeral 1 is an outer panel forming outer face of a door, to which reinforce 2 is connected. Inner panels (not shown) are attached regular intervals inside of the outer panel 1 of the outside, and elevatable door glass 3 is received between the outer panel 1 and the inner panel 2 (not shown). There is provided an engaging hole 6 at the top margin of the outer panel 1.

Reference numeral 7 is a door molding, having a cross-section substantially inverted U-shape, and a surface integrated and covered with weather strip 8. The weather strip a comprises two large lip-portion 8a which slidably contact with the door glass 3 at the inside of the door molding 7, and one small lip 8a formed in the vicinity of the outer end 9 of the door molding 7, which contacts with the surface of the outer panel 1.

Reference numeral 5 is a clip, which is used for attaching the door molding to the top margin 4 of the outer panel 1. As the fundamental structure, the clip 5 comprises a pair of inner engagement pieces 11 upwardly formed from both ends outside of the bottom edge of a planar body 10, and a pair of outer engagement pieces 12 downwardly formed from both ends outside of the top edge of the planar body 10. Also between these outer engagement pieces 12 of both ends, a boss 13 is formed in the upper portion, and an elastic salient 14 is formed in the central portion. A slit 15 is formed surrounding the elastic salient 14 in three sides thereof, so as to allow the elastic salient 14 to be inwardly deflectable with the slit 15. The outer engagement pieces 12 of the clip 5 have narrow width $d_1$ in order to form the boss 13 and the elastic salient 14 between the outer engagement pieces 12 as described above. However the width $d_1$ of the outer engagement pieces 12 cannot be widened further due to the problem of molding.

Then the clip 5 is previously inserted into the inside of the door molding 7. Once the clip 5 inserted into the door molding 7, as the inner edge 16 of the door molding 7 is pinched and held between the inner engagement pieces 11 of the clip 5 and body 10, and that the outer end 9 engages to the bottom edge of the outer engagement pieces 12, the clip 5 does not readily slip away out of the door molding 7 and these two members are integrated. Also, the outer engagement pieces 12 is held slightly slanted inwardly by engaging the outer end 9 of the door molding 7 with the lower edge of the outer engagement pieces 12.

When the door molding 7 incorporated with clips 5 is attached to the top margin 4 of the outer panel 1, the top margin 4 is inserted between the outer engagement pieces 12 and the body 10 to pinch the top margin 4 therebetween. At this time the elastic salient 14 of the clip 5 penetrates into the engagement hole 6 formed at the top margin 4 of the outer panel 1, so as to prevent the door molding 7 from dropping out therefrom and should be completely assembled. As the boss 13 which connects with the edge of the top margin 4 is formed on the elastic salient 14, the door molding 7 is not unnecessarily pushed down downwardly.

However, in such Prior Art as described above, since the width $d_1$ of the outer engagement pieces 12 of the clip 5 is narrow, the outer engagement pieces 12 do not always sufficiently pinch the top margin 4 of the outer panel 1. Thus, ideally the width $d_1$ of both outer engagement pieces 12 should be made wider for obtaining sufficient pinching force, however, if the width $d_1$ of the outer engagement pieces 12 is made too wide as described above, the outer engagement pieces 12 may overlap with the boss 13 or elastic salient 14 so that it will be impossible to mold the pieces, therefore there was no other solutions than having narrower width $d_1$ for the outer engagement pieces 12. Accordingly, since pinching the top margin 4 of the outer panel 1 with the outer engagement pieces 12 was weak, there was a possibility that the door molding 7 staggers because of the vibration during running, or, the door molding 7 slantedly inclines inwardly due to the force F shown in FIG. 11.

The present invention is to overcome these inconvenience of the Prior Art as described above, and the object thereof is to provide a clip for door molding which can pinch more securely an outer panel.

SUMMARY OF THE INVENTION

According to the first aspect of the present invention, an interposed engagement piece is formed between a pair of outer engagement pieces provided on the clip for door molding, comprising a contact section corresponding to the edge of the top margin of an outer panel, and a pinch section formed in the form of bend downwardly from the tip of the contact section for pinching and holding the top margin of the outer panel with its body region.

In the first aspect of the present invention, as not only the outer engagement pieces but also interposed engagement piece hold the top margin of the outer panel, the force of pinching an outer panel by clips is stronger and the door molding will not be easily loosened. Also, the entire width of the outer engagement piece itself is set to be as narrow as the conventional clips, and the piece does not overlap with other pieces such as the interposed engagement pieces, so that molding may become available.

According to the second aspect of the present invention, the bottom edge of the pinch section of the interposed engagement piece is bent in the direction of diverging away from the body.

In the second aspect of the present invention, by bending the bottom edge of the pinch section of the interposed engagement piece in the direction of diverging away from the body, an inserting operation of the top margin of the outer panel between the interposed engagement piece and the body will be made easier.

According to the third aspect of the present invention, the angle of the outer engagement pieces to the body is set to be wider than that of the interposed engagement piece to the body in injection molding.

In the third aspect of the present invention, by setting the angle of the outer engagement pieces to the body to be wider than that of the interposed engagement piece to the body in injection molding, the outer engagement pieces will not interfere the molding of interposed engagement piece so that the latter can be readily molded. Also by previously setting the angle of the outer engagement pieces to the body to be wider, the interposed engagement pieces of the form that could not be molded in the conventional manner can be molded. Even though the angle of the outer engagement pieces is previously set to be wider, no problem will be arisen because the outer engagement pieces will be thermally shrunk after injection molding, such that the angle will become same as the predetermined design angle.

According to the fourth aspect of the present invention, an elastic salient, which engages with a hole or a recess made in the top of the outer panel, is formed on the outer surface of the clip body.

In the fourth aspect of the present invention, by forming on the outer surface of the clip body an elastic salient which engages with a hole or a recess made in the top of outer panel, it is assured to prevent slipping-out of the clip after assembling.

The above cited and other objects, advantages, features, and the application of the present invention will become more apparent by reading carefully the following description with reference to the accompanying drawings, and the present invention is intended not to be limited by above description. Also, any appropriate modification should be understood to be incorporated therein without departing from the scope and the spirit of the present invention.

DETAILED DESCRIPTION OF THE PREFERRED EMBODIMENTS

One of the preferred embodiments of the present invention will be described hereinbelow with reference to FIG. 1 to FIG. 8. Similar reference numerals are designated to members of which the structure or the function is approximately identical to that of the Prior Art for the purpose of simplicity.

Figure 1:
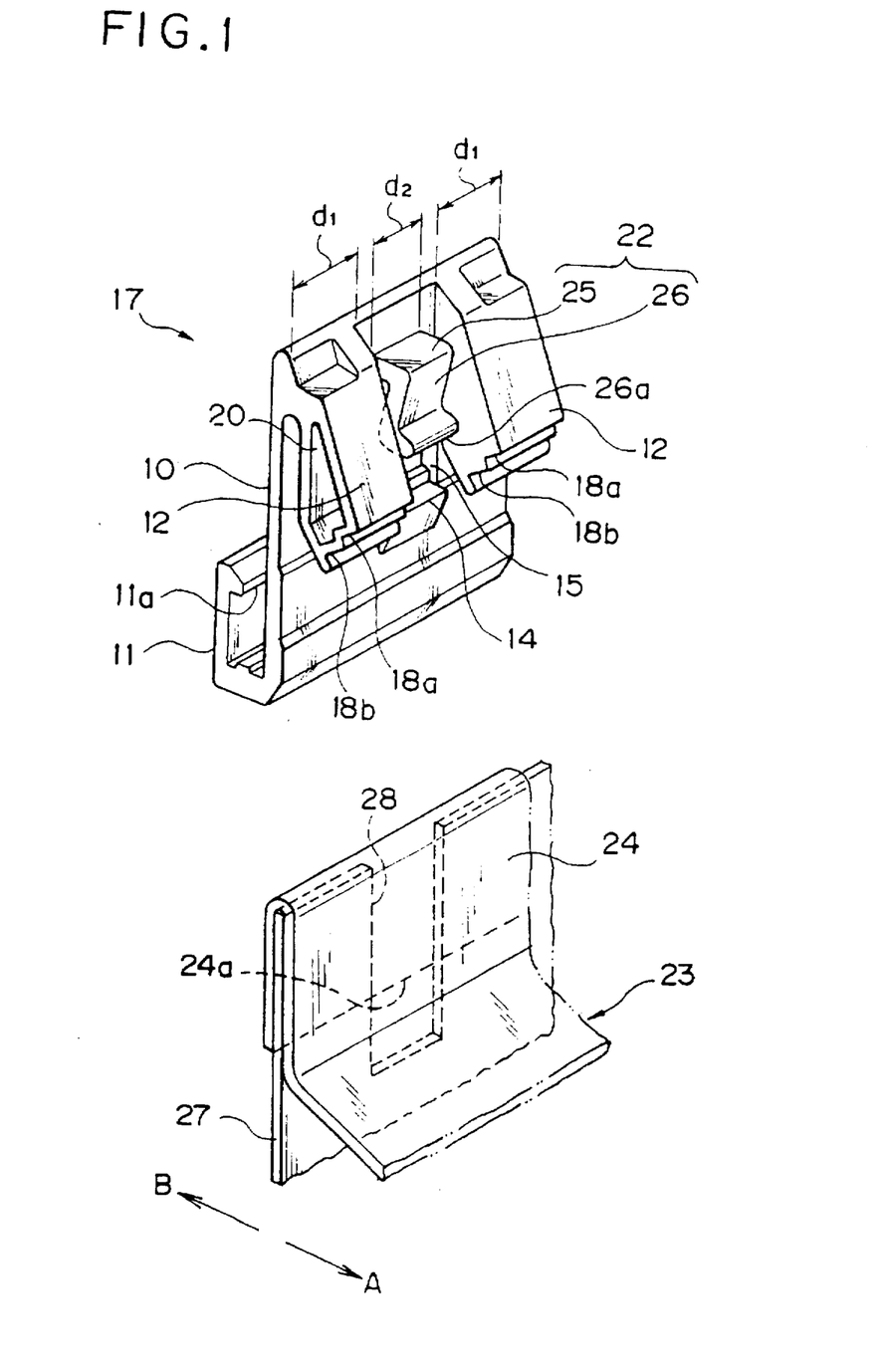
FIG. 1 shows a perspective view of a clip according to one embodiment of the present invention.

The clip 17 according to this embodiment of the present invention has a fundamental structure similar to the clip of the Prior Art having on its planar body 10, that has first and second opposing edges 101, 102 respectively, inner engagement pieces 11, outer engagement pieces 12, and an elastic salient 14. As shown in FIG. 1 the inner engagement piece 11 extends from the first edge 101 of the planar body 10 on the first side portion and the outer engagement pieces 12 extend from the second edge 102 of the planar body 10 on the second side. Additionally, there are two steps 18a and 18b formed at the bottom edge of the outer engagement pieces 12, upper step 18a engaging with the outer end 9 of door molding 7, and lower step 18b engaging with the edge 19 of weather strip 8. In addition, recesses 20 are defined from both sides of each of the outer engagement pieces 12. The recesses 20 are formed for reducing the weight and the materials of the clip 17.

Figure 2:
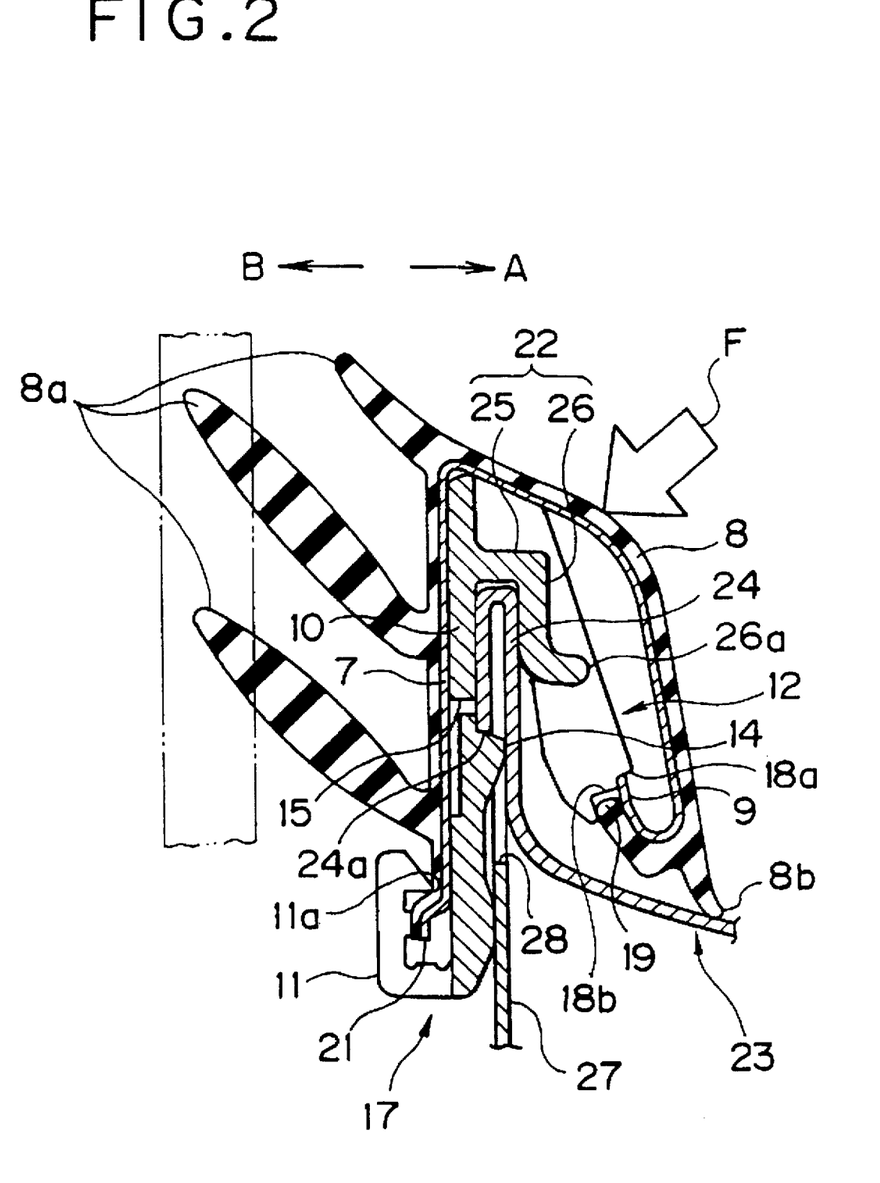
FIG. 2 shows a cross-sectional view indicating that a door molding is attached to the top margin of an outer panel by the clip.

As shown in FIG. 2, the inner edge 21 of the door molding 7 is formed to be inwardly stepwise so as to engage the tip of the pawl 11a formed on the inner engagement pieces 11 of the clip 17 with the stepped inner edge 21 when the top of the clip 17 contacts with the top of the door molding 7, in order to prevent the inner edge 21 from slipping out upwardly.

As also shown in FIG. 1, the outer engagement pieces 18 include a first surface portion 181, extending from the second surface edge 102 and a second portion 182 extending from the same location. The portion that includes the steps 18a and 18b serves as a connection portion extending between the respective distal ends of the first and second portions.

On top of the elastic salient 14 between the outer engagement pieces 12 of both sides there is formed an interposed engagement piece 22, which characterizes the present invention. The interposed engagement piece 22 has width $d_2$ approximately corresponding to the outer engagement pieces 12, and is comprised of a contact section 25 opposed to the edge of the upper end 24 of an outer panel 23, and a pinching section 26 downwardly bent from the tip of the contact section 25. The contact section 25 is sized to the thickness of the upper end 24 of the outer panel 23. The bottom end 26a of the pinching section 26 of the outer panel 23 is formed which bends in the direction of dispersing away from the body 10.

Figure 3:
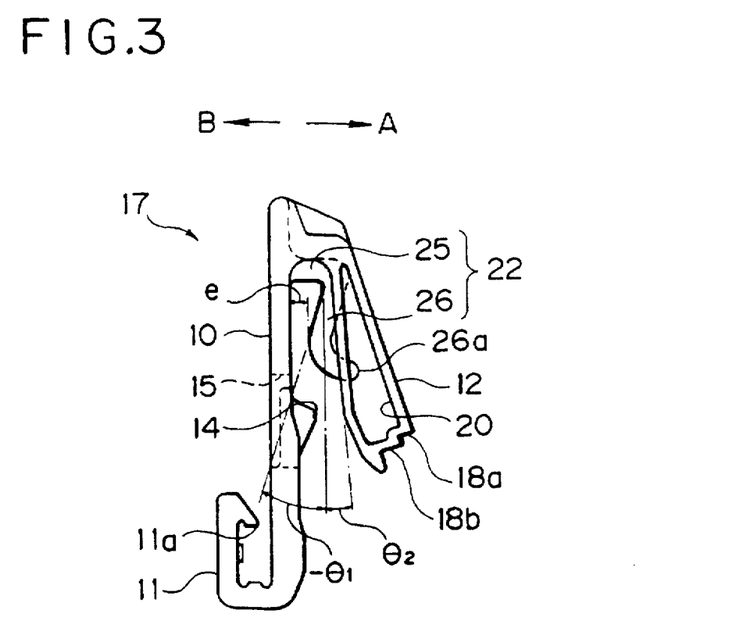
FIG. 3 shows a side elevation of the clip indicating a state after thermal shrinkage.

As shown in FIG. 3, before assembly, the interposed engagement piece 22 of the clip 17 has the bottom end 26a of the pinching section 26 being close to the body 10, the pinching section 26 being inclined by an angle $-\theta_1$ from the parallelism in respect to the body 10 (in FIG. 3, the angle $-\theta_1$ is more or less exaggerated for clarity). Thus the narrowest space e between the pinching section 26 and body 10 will be smaller than the thickness of the upper end 24 of the outer panel 23. However, as stated above, as the bottom end 26a of the pinching section 26 is bent in the direction of dispersing away from the body 10, the insertion of the upper end 24 of the outer panel 23 inside the pinching section 26 will be facilitated. On the other hand, the outer engagement pieces 12 are inclined by an angle $\theta_2$ more or less larger than the parallelism in respect to the body 10.

For the clip 17 as a product before assembled to the outer panel 23, the interposed engagement piece 22 and outer engagement pieces 12 are set to the angle $-\theta_1$, $\theta_2$ as described above. The angle of the interposed engagement piece 22 and the outer engagement pieces 12 need to be previously set to be somewhat larger at the time of the injection molding in order to obtain the exact angles $-\theta_1$ and $\theta_2$, because these angles will become narrower after molding because of thermal shrinkage.

Figure 4:
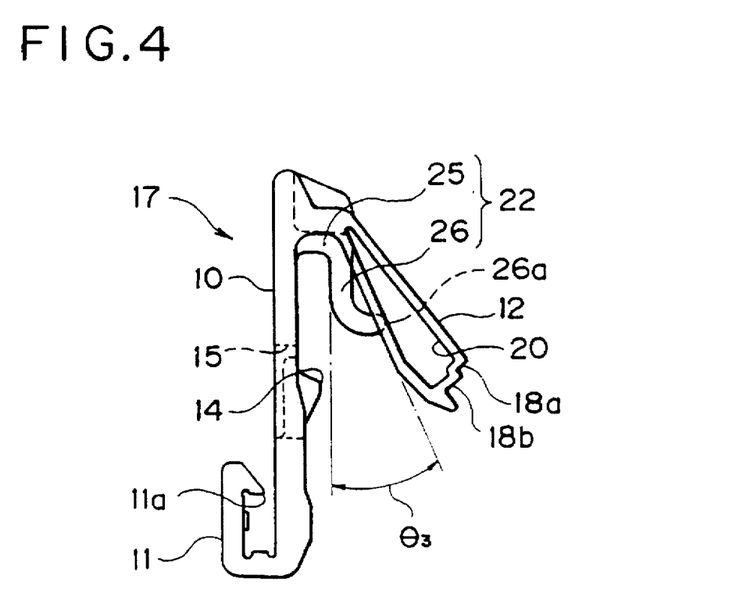
FIG. 4 shows a side elevation of the clip indicating a state before thermal shrinkage.
Figure 5:
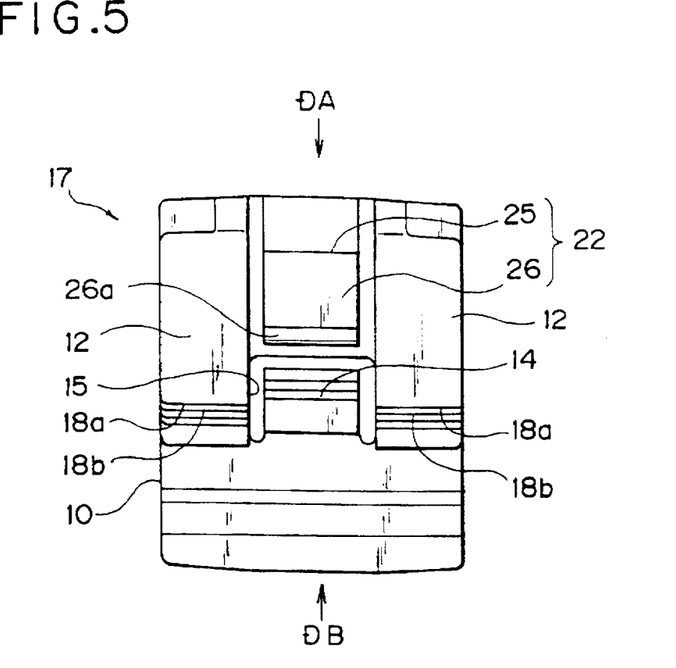
FIG. 5 shows a front elevation of the clip.
Figure 6:
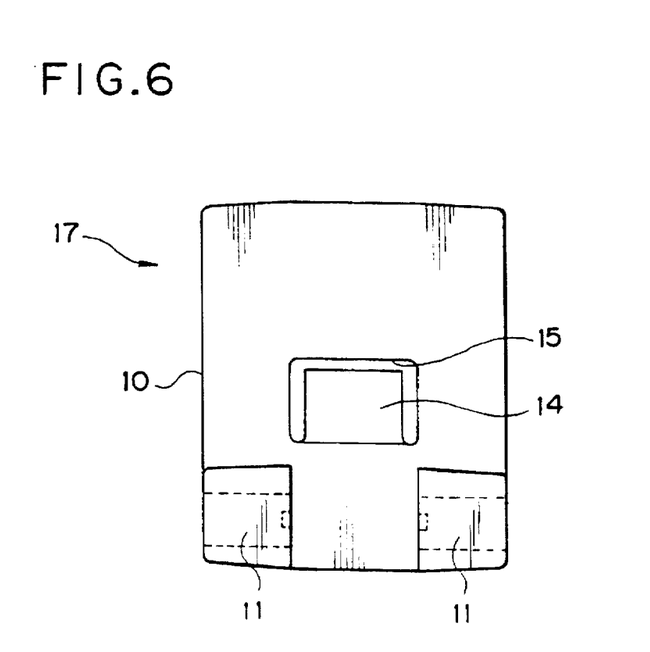
FIG. 6 shows a rear elevation of the clip.
Figure 7:
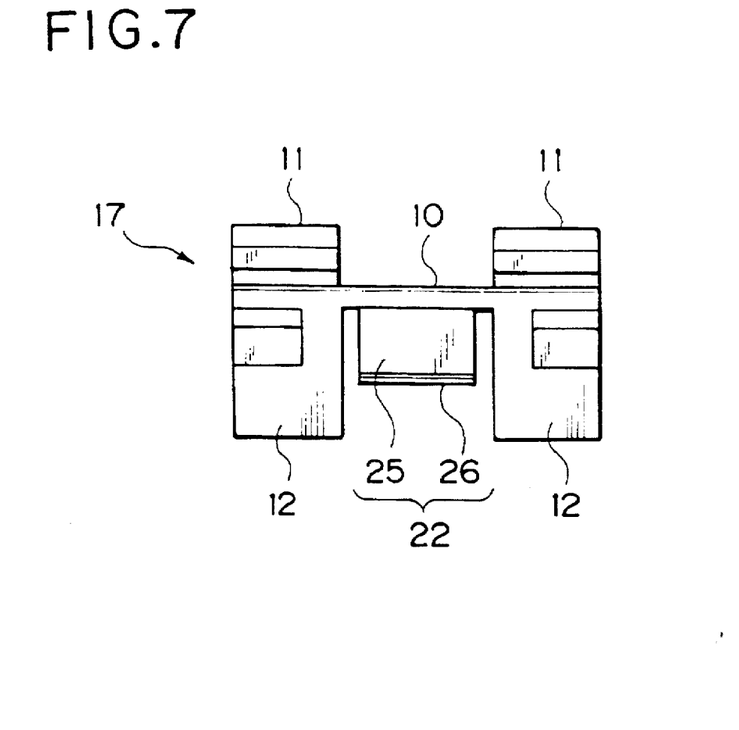
FIG. 7 shows a top plan view of the clip, viewed from the direction of the arrow DA of the FIG. 5.
Figure 8:
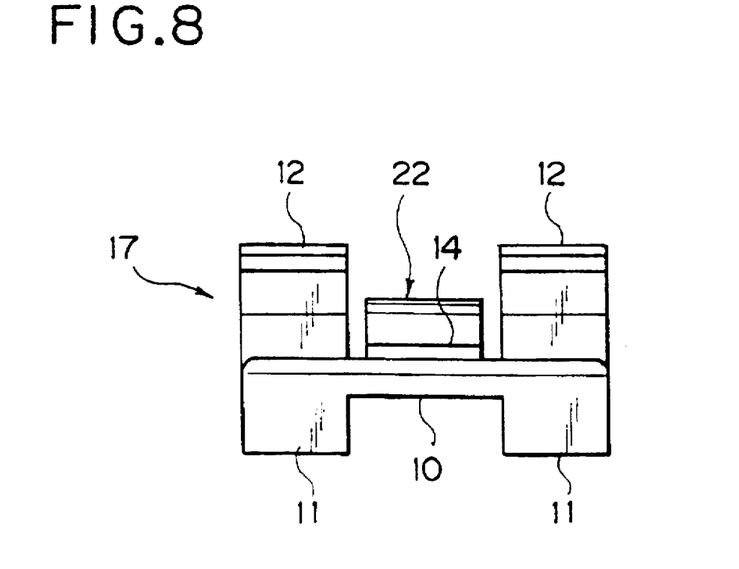
FIG. 8 shows a bottom plan view of the clip, viewed from the direction of the arrow DB of the FIG. 5.

FIG. 4 shows the clip 17 just after the injection molding (prior to the thermal shrinkage). The interposed engagement piece 22 is parallel to the body 10, at the angle 0 ($>-\theta_1$), and the outer engagement pieces 12 is set to have a somewhat larger angle $\theta_3$ ($>\theta_2$) in respect to the body 10 (in FIG. 4, the angle $\theta_3$ is exaggerated for prominently indicating the inclination). Thus the angle $\theta_3$ of the outer engagement pieces 12 is sufficiently larger than the angle 0 of the interposed engagement piece 22.

The interposed engagement piece 22 is downwardly bent at the position between both outer engagement pieces 12, so originally the outer engagement pieces 12 of both sides make molding of the interposed engagement piece 22 therebetween difficult or unachievable. However, the angle $\theta_3$ of the outer engagement pieces 12 of both sides is larger than the angle 0 of the interposed engagement piece 22 according to the present invention, so that the molding of the interposed engagement piece 22 will be allowed to be reliably done by inserting a sliding die for the interposed engagement piece 22 from under the outer engagement pieces 12. Then after molding, the interposed engagement piece 22 and outer engagement pieces 12 will have the predetermined production angles $-\theta_1$, $\theta_2$ as shown in FIG. 3, due to their thermal shrinkage. It should be noted that the amount of change of the angle by thermal shrinkage may vary by factors such as the type of resin used, temperature of heating material at the time of molding, cooling condition after molding, shape of the interposed engagement piece 22 or outer engagement pieces 12 (especially the form of their bases). Mold die must be designed based on the accurate estimation of the change of angle by thermal shrinkage due to these factors.

The clip 17 manufactured as described above is inserted inside the door molding 7 as conventionally done, so as to pinch the inner edge 21 of the door molding 7 by the inner engagement pieces 11 to engage the outer end 9 of the door molding 7 with the upper step 18a of the lower end of outer engagement pieces 12. The outer engagement pieces 12 will be pressed inwardly to some extent by the engagement of the outer end 9 of the outer engagement pieces 12 with the upper step 18a of the outer engagement pieces 12, so that the angle will be more or less narrower than the angle $\theta_2$ of after thermal shrinkage.

After that, the clip 17 incorporated in the door molding 7 is attached to the upper end 24 of the outer panel 23. As the upper end 24 of the outer panel 23 to attach the clip 17 is folded up to be attached to the upper edge of the reinforce 27, and a partial notch 28 is formed in the upper edge of the reinforce 27, the extent in which the notch 28 is formed in the upper end 24 of the outer panel 23 is recessed.

By attaching the clip 17 incorporated in the door molding 7 to the upper end 24 of the outer panel 23, the upper end 24 is inserted between the outer engagement pieces 12 and the body 10 as well as inserted between the interposed engagement piece 22 and the body 10. This causes the elastic salient 14 of the clip 17 to be engaged with the notch 28, thus the elastic salient 14 engages the folded inner edge 24a of the upper end 24 to prevent the clip 17 from slipping out upwardly.

In this embodiment, not only the outer engagement pieces 12 but also interposed engagement piece 22 pinch and hold the upper end 24 of the outer panel 23, so that the force to pinch and hold the upper end 24 is stronger than the conventional manners. Therefore the door molding 7 will be neither loosened by the vibration while driving, nor inclined when a strong force F is applied to the door molding 7. Especially, in this embodiment, since the pinching section 26 of the interposed engagement piece 22 has a negative angle $-\theta_1$ due to thermal shrinkage, the force to pinch and hold the upper end 24 of the outer panel 23 will be stronger.

According to the present invention, as cited above, as not only the outer engagement pieces but also the interposed engagement piece pinch and hold the top margin of the outer panel, the force of pinching the outer panel with clips is strong and the door molding will not be easily loosened. Also, the entire width of the outer engagement piece itself is set to be as narrow as conventional clips, and the piece does not overlap with other pieces such as the interposed engagement pieces, so that molding may become available.

Also according to the present invention, by bending the bottom edge of the pinch section of the interposed engagement piece in the direction of diverging away from the body, the inserting operation of the top margin of the outer panel between the interposed engagement piece and the body will be made easier.

Furthermore, according to the present invention, by setting the angle of the outer engagement pieces to the body to be wider than the angle of the interposed engagement piece to the body in injection molding, the outer engagement pieces will not interfere the molding of the interposed engagement piece so that the latter can be readily molded. Also by previously setting the angle of the outer engagement pieces to the body to be wider, the interposed engagement pieces of the form that could not be molded in the conventional manner can be molded. Even though the angle of the outer engagement pieces is previously set to be wider, no problem will be arisen because the outer engagement pieces will be thermally shrunk after injection molding, such that the angle will become same as the predetermined design angle.

In addition, according to the present invention, by forming on the outer surface of the clip body an elastic salient which engages with a hole or a recess made in the top of the outer panel, it is assured to prevent slipping-out of the clip after assembling.

What is claimed is:

1. A clip for attaching a door molding to a periphery of a door panel, the clip comprising:

a generally planar body portion having first and second opposing sides and first and second opposing edges;

an inner engagement piece extending from said first edge of said planar body portion on said first side, said inner engagement piece and said planar body portion defining a groove portion;

a pair of spaced apart outer engagement pieces extending from said second edge of said planar body portion on said second side, each outer engagement piece comprising:

a first surface portion extending from said second edge;

a second surface portion extending from generally the same location as said first surface portion and at an angle relative to said first surface portion such that respective distal ends of said first and second surface portions are spaced apart from one another; and a connecting surface portion extending between said respective distal ends of said first and second surface portions, whereby the outer engagement pieces simultaneously engage both the door molding and the door panel; and an intermediate engagement piece located between said pair of outer engagement pieces and extending from said second edge on the same side as said pair of outer engagement pieces.

2. A clip for attaching a door molding to a periphery of a door panel, the clip comprising:

a generally planar body portion having first and second opposing sides and first and second opposing edges;

an inner engagement piece extending from said first edge of said planar body portion on said first side of said inner engagement piece and said planar body portion defining a groove portion;

a pair of spaced apart outer engagement pieces extending from said second edge of said planar body portion on said second side, each outer engagement piece comprising:

a first surface portion extending from said second edge;

a second surface portion extending from the same location as said first surface portion and at an angle relative to said first surface portion such that respective distal ends of said first and second surface portions are spaced apart from one another such that the outer engagement portion simultaneously engages both the door molding and the door panel; and a connecting surface portion extending between said respective distal ends of said first and second surface portions; and an intermediate engagement piece located between said pair of outer engagement pieces and extending from the same side as said pair of outer engagement pieces;

wherein each said outer engagement piece is hollowed out.

3. A clip for attaching a door molding to a periphery of a door panel, the clip comprising:

a generally planar body portion having first and second opposing sides and first and second opposing edges;

an inner engagement piece extending from said first edge of said planar body portion on said first side, said inner engagement piece and said planar body portion defining a groove portion;

a pair of spaced apart outer engagement pieces extending from said second edge of said planar body portion on said second side, each outer engagement piece comprising:

a first surface portion extending from said second edge;

a second surface portion extending from the same location as said first surface portion in a different direction than the first surface portion such that the first and second surface portions diverge from one another and the respective distal ends of said first and second surface portions are spaced apart from one another; and a connecting surface portion extending between said respective distal ends of said first and second surface portion; and whereby the outer engagement pieces simultaneously engage both the door molding and the door panel;

an intermediate engagement piece located between said pair of outer engagement pieces and extending from the same side as said pair of outer engagement pieces;

whereby the intermediate engagement piece and the outer engagement pieces are adapted to engage the door panel.

4. The clip according to claim 3, wherein said groove portion is constructed and arranged to retain an inner edge of the door molding therein.

5. The clip according to claim 3, wherein said pair of outer engagement pieces are constructed and arranged to engage an outer edge of the door molding and to retain the periphery of the door panel between said pair of outer engagement pieces and said planar body portion.

6. The clip according to claim 3, wherein a distal portion of said intermediate engagement piece is turned away from said planar body portion.

7. The clip according to claim 3, further comprising a salient made from an elastic material provided on said second side.

8. The clip according to claim 3, wherein each said outer engagement piece is hollowed-out.

9. The clip according to claim 3, wherein said connecting surface portion includes a stepped portion.

10. The clip according to claim 3, wherein said intermediate engagement piece comprises a contact section which extends generally perpendicularly from said planar body portion and a pinching section which extends from said contact section in a direction generally parallel to said planar body portion.

11. The clip according to claim 9, wherein the stepped portion comprises an upper step adapted to engage a portion of the door molding and a lower step adapted to engage a weather strip.

* * * * *